United States Patent [19]

Murayama

[11] 3,956,580

[45] May 11, 1976

[54] SYSTEM FOR REDUCING THE TRANSMISSION TIME OF SIMILAR PORTIONS OF VISIBLE IMAGES

[75] Inventor: Noboru Murayama, Sagamihara, Japan

[73] Assignee: Ricoh Co., Ltd., Tokyo, Japan

[22] Filed: Feb. 3, 1975

[21] Appl. No.: 546,502

Related U.S. Application Data

[63] Continuation of Ser. No. 460,468, April 12, 1974, abandoned, which is a continuation of Ser. No. 212,088, Dec. 27, 1971, abandoned.

[30] Foreign Application Priority Data

Dec. 30, 1970 Japan.............................. 45-123406

[52] U.S. Cl............................... 178/6; 178/DIG. 3; 179/15 BW
[51] Int. Cl.².......................................... H04L 3/00
[58] Field of Search ......... 178/7.1, 5.6, 6.8, DIG. 3, 178/6; 325/38 B; 179/15 BW, 15.55 T

[56] References Cited
UNITED STATES PATENTS

| | | |
|---|---|---|
| 3,347,981 | 10/1967 | Kagan et al.................... 178/DIG. 3 |
| 3,571,505 | 3/1971 | Mounts............................... 178/6.8 |
| 3,686,631 | 8/1972 | Elliott........................... 178/DIG. 3 |

*Primary Examiner*—George H. Libman
*Attorney, Agent, or Firm*—Cooper, Dunham, Clark, Griffin & Moran

[57] ABSTRACT

In a transmitter, a fixed visible image or the subject copy is scanned with a predetermined scanning line width to convert the divided image pattern of each scanning line into a binary coded bit pattern; an old bit pattern of a scanning line is compared with a new bit pattern of the next scanning line to determine the similarity or coincidence therebetween; and when their similarity is higher than a predetermined degree, instead of the new bit pattern, the address signals representing the positions of the associated pairs of different bits in said old and new bit patterns are transmitted. In a receiver, the bits of said old bit pattern in the positions designated by said address signals are changed in polarity or the like, thereby reproducing said new bit pattern.

6 Claims, 6 Drawing Figures

(a)

(b)

(c)

SYSTEM FOR REDUCING THE TRANSMISSION TIME OF SIMILAR PORTIONS OF VISIBLE IMAGES

This is a continuation of application Ser. No. 460,468 filed Apr. 12, 1974 now abandoned, which is in turn a continuation of application Ser. No. 212,088, filed Dec. 27, 1971, now abandoned.

BACKGROUND OF THE INVENTION

The present invention relates to an information transmission system, and more particularly a system for transmitting the visible images such as letters, pictures and the like represented in the binary coded signals.

For example, in facsimile the blackness of elementary areas of a fixed image or subject copy is converted into the binary coded electrical pulses or bits. That is, the image or subject copy is sequentially scanned with a predetermined scanning line width to be converted into the corresponding electrical video signals which in turn are sampled with an appropriate interval in order to convert them into the binary coded electrical signals. The binary coded electrical signals are then transmitted by wire or wireless to a receiving station, wherein the received signals are demodulated to reproduce the visible image on a record sheet.

The system for transmitting all of the binary coded electrical signals by carrier waves has a defect that the transmission time becomes longer. For example, assume that a subject copy 210 by 297 mm is transversely, sequentially scanned with a scanning line of three-lines per milimeter, and the video signals per scanning line are sampled at 1,024 points to convert them into the binary coded electrical signals. In this case, the blackness of elemental areas in each scanning line are converted into 1,024 bits so that when the telephone line of 2,400 bauds is used, it takes about 6 to 10 minutes to transmit the above subject copy.

When the subject copy is scanned to be converted into the binary coded electrical signals, it is rather rare that the signals representing the black and white are alternately generated at an extremely high frequency. In practice, one binary signals representing black or white are generated in succession. Therefore, assume that ten signals representing for example "1" are generated in succession, and then fifty signals representing "0" are generated in succession. Then, only four bits are required to represent the "1" pulse train, whereas six bits are required to represent the "0" pulse train when the binary number is used. Therefore, it is readily seen that a number of bits to be transmitted and hence the transmission time can be remarkably reduced when the "1" or "0" signal pulse train is represented by the binary number in the manner described above as compared with the case in which every bit of the binary coded signals is transmitted. Various prior art information systems which intend to minimize the transmission time, are all based on the above described principle.

Recently attempts have been made to couple a transmitter station of facsimile to a receiving station by a low-speed telephone line system, but the satisfactory reduction in transmission time cannot be achieved when the binary coded signals are compressed in the manner described above.

Accordingly, one of the objects of the present invention is to provide an improved information transmission system by which the transmission time can be reduced to such an extent hitherto unattained by the prior art system.

When the subject copy to be transmitted consists of letters, pictures or the like, the mutual relation or similarity between the bit patterns of the adjacent scanning lines are in general very high. In some cases, the two bit patterns are completely similar or only a few bits are different. The binary-coded-electrical-signal compression in accordance with the present invention is based upon this observed fact.

According to one embodiment of the present invention, every bit in a bit pattern (to be referred to as an old bit pattern) of a scanning line is compared with associated bit in a bit pattern (to be referred to as a new bit pattern) of the next scanning line. When the old and new bit patterns are coincident with each other, an EQL code signal representing that the new bit pattern is identical or coincident with the old bit pattern, is transmitted instead of the new bit pattern. When the mutual relation or similarity between the old and new bit patterns is higher than a predetermined degree; that is, when the old and new bit patterns are different only in a limited number of bit positions, an ANL (analogous) code signal representing the higher similarity therebetween is transmitted, and the address signals follow which represent the bit positions of the old and new bit patterns only at which they are different. When the old and new bit patterns are entirely or widely different, a NEW code signal representing their desimilarity is transmitted, and followed by the new bit pattern. At a receiving station, the code signals are decoded first. When the EQL code signal is decoded, the old bit pattern previously stored in for example a shift register, is used as the new bit pattern. When the ANL code signal is detected, the address signals following the ANL code signal designate the positions of the bits of the old bit pattern at which the bits must be inverted in polarity or level so that the new bit pattern may be reproduced. When the NEW code is detected, the new bit pattern is used as it is. In like manner, the binary coded bit patterns are compressed and transmitted at the transmitting station, and the received signals are reproduced in the original bit patterns at the receiving station.

The similarity or mutual relation between the bit patterns of the adjacent scanning lines becomes higher as the scanning line width is decreased. In other words, the higher the resolution is desired, the higher the similarity or mutual relation must become. Therefore, the advantages of the information transmission system in accordance with the present invention becomes more pronounced as the higher resolution is required because the bit pattern compression effect and hence the reduction in information transmission time are enhanced.

The above and other objects, features and advantages of the present invention become more apparent from the following description of the preferred embodiment thereof taken in conjunction with the accompanying drawing.

DESCRIPTION OF THE PREFERRED EMBODIMENT

Figure 1:
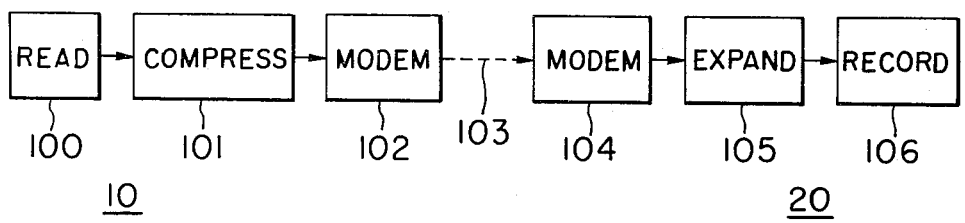
FIG. 1 is a block diagram of one preferred embodiment of an information transmission system in accordance with the present invention.

Referring to FIG. 1, a transmitter 10 comprises in general a scanning reader 100, a data compressor 101, and a transmission modem 102. The elemental areas of a fixed image or subject copy are scanned by the reader 100 to be converted into the binary coded electrical pulses or bit pattern depending upon the blackness of the scanned elemental areas. The data compressor 101 compares the old bit pattern of one scanning line with the new bit pattern of the next scanning line to generate an "EQL" code signal, "ANL" code signal, address signals, a "NEW" code signal, and new bit pattern signals depending upon the similarity between the old and new bit patterns.

A receiver generally designated by 20 comprises in general a reception modem 104, an expander 105, and a recorder 106. The expander 105 is adapted to generate a bit pattern for each scanning line in response to the various received code signals described above, and the recorder 106 records on a record sheet the transmitted image or subject copy. The transmitter 10 is connected to the receiver 20 by a transmission line 103.

Figure 2A:
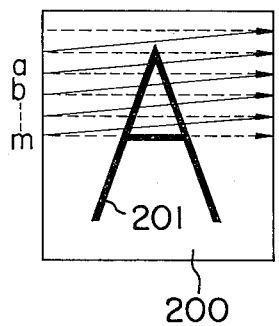
FIGS. 2a and 2b are a diagram used to explain the scanning method thereof.
Figure 2B:
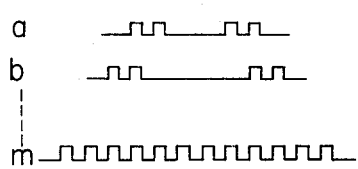

The scanning reader 100 sequentially scans for example the letter "A" designated by 201 in FIG. 2 (A) on the subject copy 200 with an appropriate scanning line width to convert the black and white pattern of each scanning line into the binary coded electrical pulses or bit pattern, which are applied to the compressor 101. The bit patterns of the scanning lines are for example illustrated in FIG. 2 (B). Since the scanning reader 100 of the type described is well known in the art of facsimile, and it does not constitute the present invention, no attempt will be made to describe this particular device in detail in this application.

Next referring to FIG. 3, the compressor 101 in the transmitter 10 will be described in more detail hereinafter. Each stage in the data compressor 101 is controlled in response to various timing and control signals from a control circuit 300, to which is applied a sync signal through a transmission line 301 whenever scanning of one scanning line is completed. In response to this sync signal, the data compressor 101 is set to "MODE 1" in which an AND gate G-1 is energized in response to the control signal from the control circuit 300. The electrical pulses or bit pattern of a scanning line is transferred into a shift register 303, whereas a bit pattern of the previous scanning line is stored in a shift register 304. It is readily seen that the content in the shift register 304 is zero prior to the starting of scanning operation by the scanning reader 100. When the data compressor 101 is set to "MODE 1" and the AND gate G-1 is energized upon completion of scanning of one scanning line, a new bit pattern on an input line 302 is transferred through the AND gate G-1 and an OR gate G-3 into the shift register 303. When the new bit pattern has been completely transferred into the shift register 303, the data compressor 101 is shifted to the "MODE 2" in which AND gates G-2, G-4 and G-7 are turned on in response to the control signals from the control circuit 300.

Figure 3:
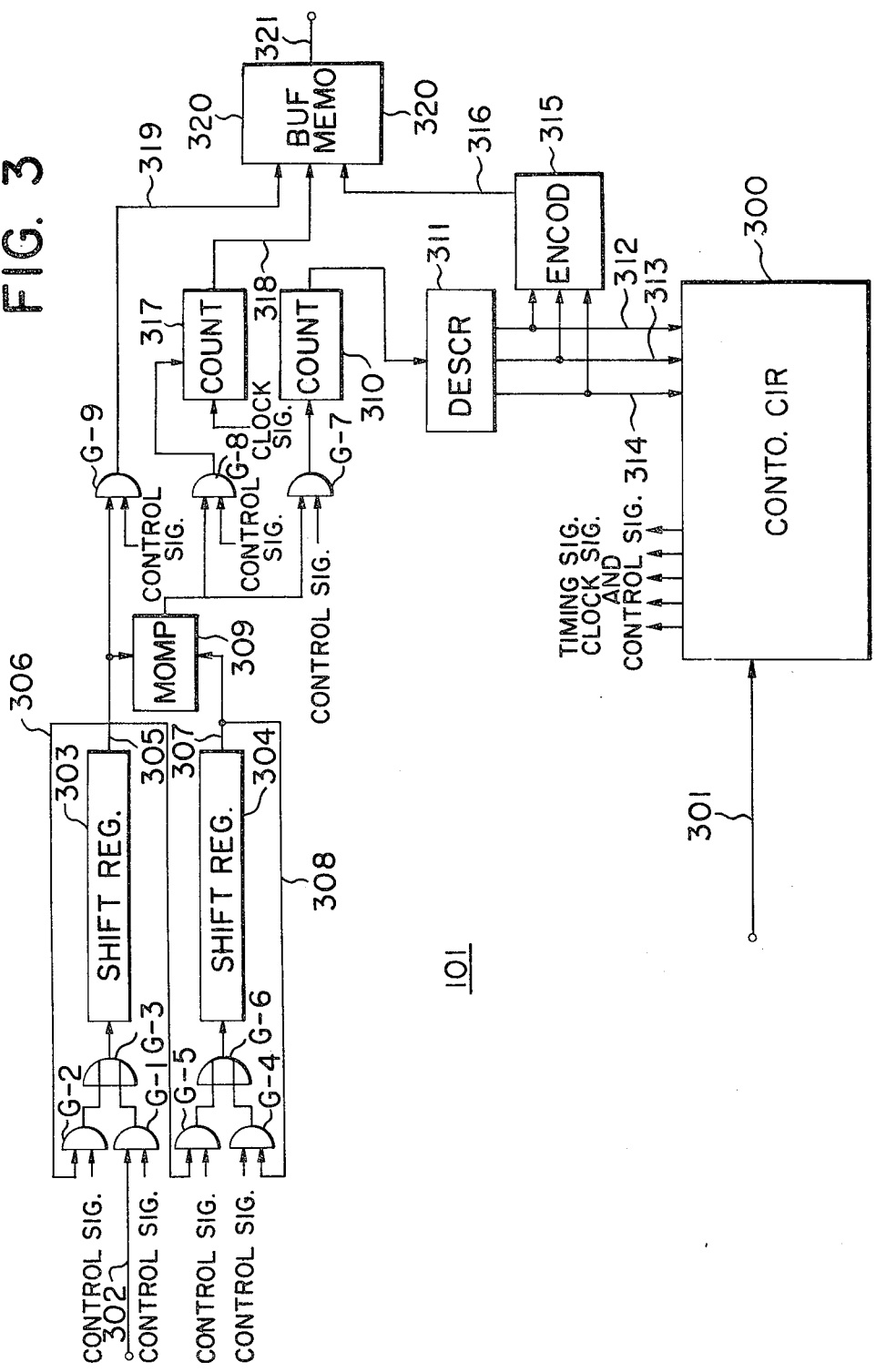
FIG. 3 is a block diagram of an information or data compressor thereof.

In this case, in response to a shift pulse (not shown) from the control circuit 300, the content in the shift register is sequentially shifted in the right direction in FIG. 3, circulated through lines 305 and 306 and the AND and OR gates G-2 and G-3, and stored in the shift register 303 again. Similarly the content in the shift register 304 is shifted, and circulated through lines 307 and 308 and the AND and OR gates G-4 and G-6 to be stored again into the shift register 304. A comparator 309 comprising an exclusive OR circuit of one bit compares each bit shifted sequentially from the shift register 303 with each corresponding bit shifted sequentially from the shift register 304 to generate the signal "1" when the two bits compared are not coincident with each other. The output signal "1" from the comparator 309 is applied to a counter 310. Therefore, when the circulation of the contents in the shift registers 303 and 304 are completed, the content in the counter 310 represents a total number of non-coincidence bits between the contents or the new and old bit patterns in the shift registers 303 and 304.

When the contents in the shift registers 303 and 304 are circulated in the manner described above, the data compressor 101 is shifted to the "MODE 3", in which the content in the counter 310 is decoded in a discriminator 311. When the content in the counter 310 is zero; that is, when the new and old bit patterns are completely coincident with each other, the signal "1" is on a line 312. When the content in the counter 310 is within a predetermined range, for example $1 \leq C_r \leq 64$, where $C_r$ is the content in the counter 310 the signal "1" is on a line 313. It should be understood that the upper limit 64 is given by way of example, and may be selected arbitrarily as needs demand. More particularly, the upper limit must be so selected that it is more advantageous in reduction of a number of bits transferred to transfer the address signals representing the positions of the non-coincidence bits between the new and old bit patterns than to transfer the whole new bit pattern. In other words, when the new and old bit patterns have a similarity higher than a predetermined degree, the signal "1" is on the line 313. When the content $C_r$ in the counter 310 is in excess of 64; that is, when $C_r > 64$, the signal "1" is on a line 314. This means the similarity between the new and old bit patterns is lower than a predetermined degree.

In response to the signal "1" on the line 312, an encoder 315 outputs "EQL" code signal, that is, EQUAL signal; ANL (analogous) code signal when the signal "1" is on the line 313; and the NEW code signal when the signal "1" on the line 314. These EQL, ANL and NEW code signals from the encoder 315 are stored in a transmission buffer memory 320 through a signal line 316, and the data compressor 101 is shifted further into "MODE 4".

In MODE 4, the contents in the shift registers 303 and 304 are shifted again, and the content in the shift register 303 is shifted into the shift register 304 through the AND and OR gates G-5 and G-6 as the old bit pattern. In this manner, the new bit patterns once stored in the shift register 303 are sequentially shifted into the shift register 304.

When the signal "1" is on the line 313 or 314, the following operation will be carried out in parallel with the shift operation described above. That is, when the signal "1" is on the line 313, an AND gate G-8 is turned on in response to the control signal from the control circuit 300, and a counter 317 is applied with a clock pulse which is in synchronism with the shift pulses (not shown) supplied to the shift registers 303 and 304. Therefore, the content in the counter 317 represents the positions or addresses of the bits in the new and old bit patterns on the lines 305 and 307. The comparator 309 outputs the non-coincidence signal "1" when the corresponding bits in the new and old bit patterns fail to coincide with each other, to the counter 317 through the AND gate G-8. As a result, in response to each non-coincidence signal "1", the counter 317 outputs the signal on a line 318. It is readily seen that the signal on the line 318 represent an address of a bit position at which the corresponding bits in the new and old bit patterns are not coincident with each other. The address signal on the line 318 is transmitted to the buffer memory 320. Thus, when the new and old bit patterns in the shift registers 303 and 304 are completely shifted onto the lines 305 and 307, the ANL code signal and the address signal are stored in predetermined storage locations in the buffer memory 320. Then, the data compressor 101 is shifted further into "MODE 5".

When the signal "1" is on the line 314, an AND gate G-9 is turned on in response to the control signal from the control unit 300, and the new bit pattern on the line 305 is transferred into the buffer memory 320 through a line 319 in addition to the NEW code signal transferred from the discriminator 315. Then, the data compressor 101 is shifted into "MODE 5".

When the signal "1" is on the line 312, the data compressor 101 is shifted to MODE 5 as soon as the contents in the shift registers 303 and 304 are completely transferred onto the lines 305 and 307. It is seen that in MODE 5 the content in the buffer memory 320 is transferred onto an output line 321.

In summary, when the new and old bit patterns are completely coincident with each other, only the EQL code signal is on the output line 321; when their similarity is $1 \leq C_r \leq 64$, both the ANL code signal and the address signals are on the output line 321; and when the similarity is for example $C_r > 64$, the NEW code signal and the new bit pattern are on the line 321. Thereafter, in response to the next sync signal on the input line 301, the control circuit 300 generates the control signal to reset the data compressor 101 to the MODE 1, and to reset the counters 310 and 317. Therefore, the above described data compression cycle is repeated.

Referring to FIG. 1, the various signals on the output line 321 are transferred to the transmission modem 102 where they are modulated and transmitted on the transmission line 103 to the receiver 20. The received signals are demodulated in the reception modem 104, and applied to the expander 105 whose function is to decode the signals coded or compressed in the data compressor 101 in the transmitter 10 into the original bit patterns.

Figure 4:
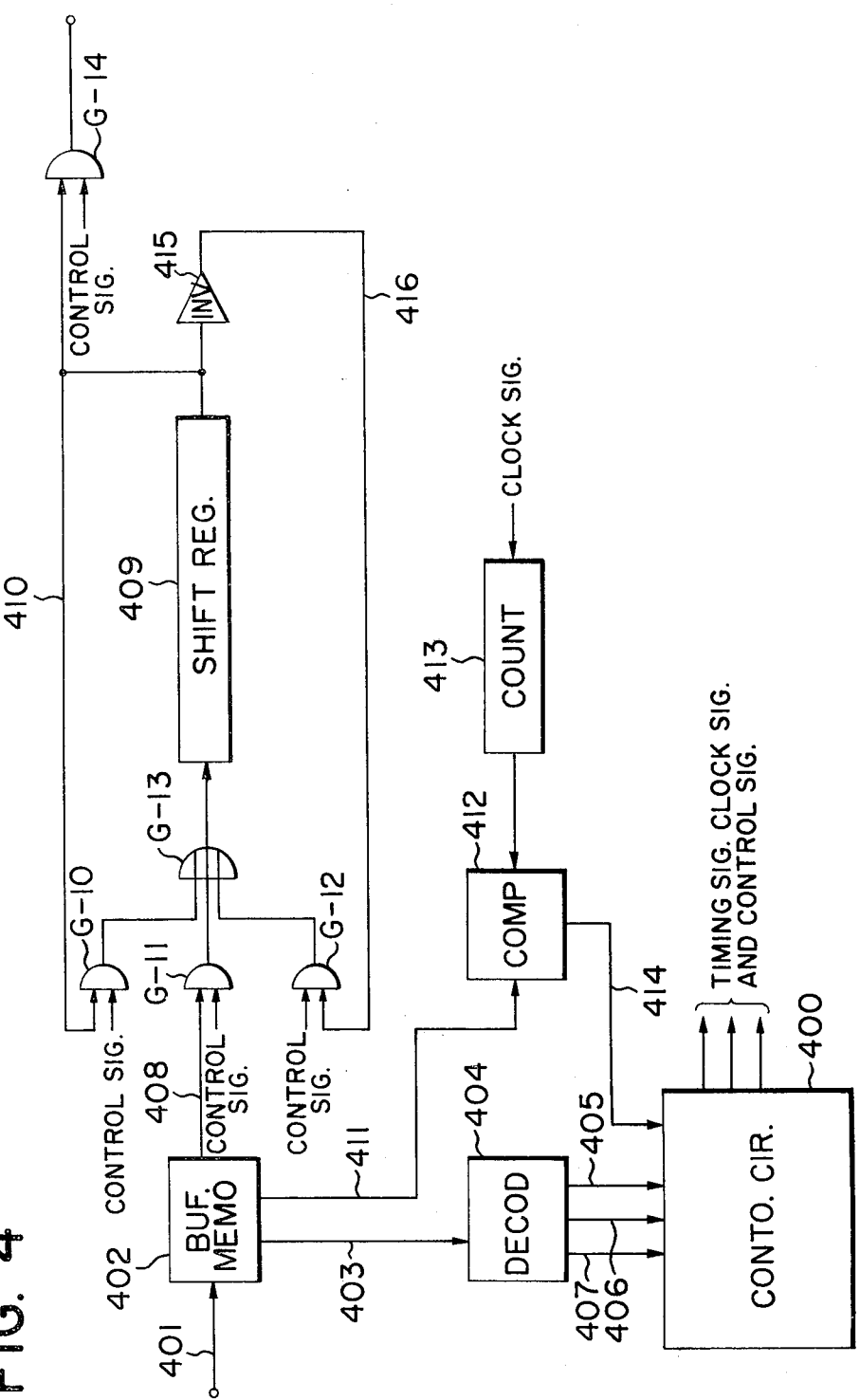
FIG. 4 is a block diagram of an information expander thereof.

Referring to FIG. 4, the expander 105 will be described in more detail hereinafter. The data expander 105 is controlled in response to the signals from a control circuit 400, and comprises a shift register 409 similar in construction to those 303 and 304 in the data compressor 101 shown in FIG. 3. The old bit pattern is stored in the shift register 409, but the content in the shift register 409 is zero before the received signals are applied from an input terminal 401 through a reception buffer register 402, an AND gate G-11, and an OR gate G-13. The received signals are first stored in the buffer register 402, and applied to a decoder 404 through a line 403. The decoder 404 outputs the signal "1" on an output line 405, 406 or 407 depending upon the received signals EQL, ANL or NEW.

When the signal "1" is on the line 405, that is, when the EQL code signal is received, the expander 105 function in the manner described hereinbelow. AND gates G-10 and G-14 is turned on in response to the control signal from the control circuit 400, and the content in the shift register 409 is sequentially shifted, and transferred onto an output line 417 through the AND gate 14. The content in the shift register 409 is also circulated along the path comprising a line 410, the AND and OR gates G-10 and G-13, and stored again in the shift register 409.

When the signal "1" is on the line 407, that is, when the NEW code signal is received, the AND gate G-11 is turned on in response to the control signal from the control circuit 400 so that the new bit pattern following the NEW code signal stored in the buffer register 402 is sequentially transferred through a line 408 and the AND and OR gates G-11 and G-13 into the shift register 409. Then, the AND gates G-10 and G-14 are turned on again in response to the control signals from the control circuit 400 so that the bit pattern in the shift register 409 is transferred onto the output line 417 through the AND gate 14, and simultaneously circulated through the AND and OR gates G-10 and G-13 to be stored again in the shift register 409.

When the signal "1" is on the line 406, that is, when the ANL code signal is received, the first of the address signals following the ANL code signal is applied to a comparator 412 through a line 411, and a counter 413 is simultaneously actuated in response to a clock signal from the control circuit 400. The comparator 412 compares the address signal received from the line 411 with the content of the counter 413. In parallel with the operation of the comparator 412, the shift register 409 shifts its content in response to a shift pulse (not shown) supplied from the control circuit 400 in synchronism with the above clock signal applied to the counter 413. Thus, it is seen that the addresses of the bits transferred on the line 410 correspond to the content in the counter 413.

A signal on a line 414 is zero when the address signal does not coincide with the content in the counter 413, but is changed to "1" when they coincide. So long as the signal on the line 414 is "0", the control circuit 400 generates the control signals to turn on the AND gate G-10 and to turn off the AND gate G-12 while the gates G-11 and G-14 remain off. Therefore, the content in the shift register 409 is circulated through the line 410, the AND and OR gates G-10 and G-13 to be stored again into the shift register 409, while the content of the counter 413 is advanced. When the address signal received from the output line 411 coincides with the content in the counter 413 so that the signal on the ouput line 414 becomes "1", the gate G-12 is turned on whereas the G-10 is turned off in response to the signals from the control circuit 400. The bit signal from the shift register 409 is inverted by an inverter 415, and is stored into the shift register 409 through an transmission line 415, an AND gate G-12 and the OR gate G-13. In this step, the next address signal is on the output line 411 from the buffer register 402. The operation described above is cycled, and whenever the signal on the output line 414 is "1", the bit signal from the shift register 409 is inverted by the inverter and stored again into the shift register 409 in the manner described above. Thus, the content in the shift register 409 is inverted only at the digit positions which are designated by the address signals from the transmitter 10.

It is readily seen that the bit pattern which is stored in the shift register 409 after some of the pulses thereof have been inverted in the manner described above, completely coincides the new bit pattern stored in the shift register 303 in the transmitter 10 shown in FIG. 3. Thereafter, the AND gates G-10 and G-14 are turned on in response to the control signals from the control circuit 400 so that the content in the shift register 409 is sequentially transferred onto the output line 417 through the AND gate G-14, and simultaneously circulated through the line 410, the AND gate G-10 and the OR gate G-13 to be stored again into the shift register 409. The above described three operations are cycled as the signals are received at the input terminal 401.

Referring to FIG. 1, the bit pattern is applied to the recorder 106 from the output line 417. In the recorder 106, the bit pattern is converted into the appropriate signals representing the blackness of the elemental areas of the fixed image or the subject copy transmitted, so that the subject copy may be reproduced in a manner well known in the art. The recorder used in facsimile is well known in the art so that no attempt will be made to describe this specific device in detail in this specification.

In the instant embodiment described above, when the new and old bit patterns are completely equal, the EQL code signal is used, whereas when their similarity is higher, the ANL code signal is used, but it is seen that a common coded signal may be used to represent their coincidence and high similarity. One scheme is such that an address signal or signals are inserted after the common coded signal representing their coincidence and higher similarity, and the address signal is zero when the new and old bit patterns are coincident with each other. When they are partly different; that is, when they have a similarity higher than a predetermined degree, the address signals representing the bit positions at which their bits or pulses are different, are inserted in the manner described above.

Figure 5:
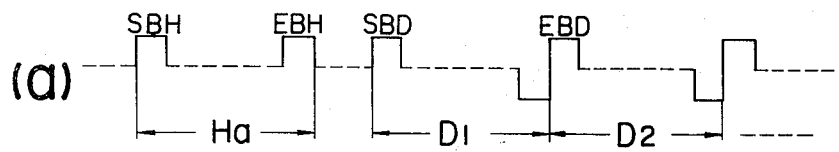
FIG. 5 is a diagram illustrating various waveforms of the code signals generated in the system of the present invention.
Figure 5:
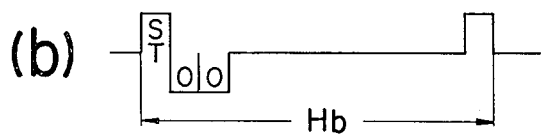
Figure 5:
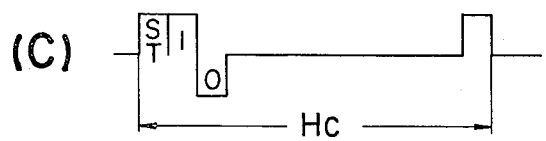

Referring to FIG. 5 (a), when the entire new bit pattern should be transmitted and received, the new data signals $D_1$, $D_2$ and so on, that is, the electrical pulse signals follow the NEW code signal Ha. When the new and old bit patterns are coincident with each other, only the EQL code signal Hb is generated as shown in FIG. 5 (b). When the new and old bit pattern have a higher similarity, the address signals follow the ANL code signal Hc. The code signals consist of ten bits at the most, and the address signal consists of ten bits when one scanning line consists of 1024 bits or elemental areas. Therefore, it is readily seen that when the new and old bit pattern has a high similarity, the system in accordance with the present invention is exceptionally advantageous over the prior art systems.

What is claimed is:

1. Information transmission system, comprising:
   means for scanning fixed visible image or subject copy with a predetermined scanning line width to convert the image pattern of each scanning line into a binary coded bit pattern, means for comparing an old bit pattern of a scanning line with a new bit pattern of the next scanning line to determine the degree of similarity or corelation therebetween, and
   means for transmitting only a first code signal representing a coincidence between said new and old bit patterns when the patterns are identical, only a second code signal representing a partial coincidence therebetween and address signals representing the positions of associated or corresponding bits which are not coincident with each other in said new and old bit patterns when said degree of similarity between the compared patterns is greater than a defined level, and only a third code signal representing a wide difference therebetween and said new bit pattern when said degree of similarity between the compared patterns is less than a defined level.

2. An information transmission system as in claim 1 wherein the comparing means comprise means for counting each noncoincidence between correspondingly positioned bits of the bit patterns and means responsive to the count in said counting means after the comparison of two scanlines to provide one of said first, second and third code signal.

3. An information transmission system as in claim 2 wherein the means for transmitting the second code signal and the address signals representing the positions of the bits which are not coincident comprise a counter whose contents are incremented in synchronism with comparing successive pairs of correspondingly positioned bits of the two compared bit patterns and means for outputing the counter contents upon the comparing of two dissimilar bits by the comparing means.

4. An information transmitting system as in claim 1 including means for receiving the transmitted signals and for reconstructing said binary coded bit patterns, comprising:
   a shift register for storing the bit pattern of a current scanline;
   means responsive to each received first code signal for outputting the contents of said shift register as the next successive scanline bit pattern;
   means responsive to receiving each second code signal and the address signals of the dissimilar bits for changing the bit of each bit position in the shift register which is identified by said address signals of dissimilar bits and for outputting the resulting contents of the shift register as the next scanline bit pattern; and
   means responsive to each received third signal and the bit pattern of the corresponding scanline to output, as the next scanline, the received bit pattern and to store the received bit pattern in the shift register.

5. An information transmission system for receiving a code obtained by comparing pairs of successive bit patterns each representing a scanline and providing a first code signal when the bit patterns are identical, a second code signal when the bit patterns contain less than a defined number of dissimilar bits in corresponding bit positions, and a third code signal when the bit patterns contain more than a defined number of dissimilar bits in corresponding bit positions, transmitting in response to each first code signal only the first code signal and an identification of the scanline to which it corresponds, without transmitting the scanline bit pattern to which said first code signal corresponds, transmitting in response to each second code signal only the second code signal and address signals identifying the bit positions of the dissimilar bits between the scanline bit pattern corresponding to said second code signal and the preceding scanline bit pattern, and transmitting in response to each third code signal only the third code signal and the entire bit pattern of the scanline corresponding to said third code signal, said system including means for reconstructing the scanline bit patterns comprising:

means for storing the bit pattern of a current scanline;

means responsive to each received first code signal for outputing the contents of the storing means as the next scanline bit pattern;

means responsive to each received second code signal and said address signals for changing the bit of each bit position in the storing means which is identified by the address signals and for outputting the resulting contents of the storing means as the next scanline pattern; and means responsive to each received third code signal and the bit pattern of the corresponding scanline to output as the next scanning line the received bit pattern and to store the received bit pattern in the storing means.

6. A system as in claim 5 wherein said storing means is a serial shift register.

\* \* \* \* \*